United States Patent
Perez-Freire et al.

(10) Patent No.: US 8,516,608 B2
(45) Date of Patent: *Aug. 20, 2013

(54) METHOD FOR DECODING A PROBABILISTIC ANTI-COLLUSION CODE

(75) Inventors: Luis Perez-Freire, Pontevedra (ES); Teddy Furon, Rennes (FR)

(73) Assignee: Thomson Licensing (FR)

( * ) Notice: Subject to any disclaimer, the term of this patent is extended or adjusted under 35 U.S.C. 154(b) by 338 days.

This patent is subject to a terminal disclaimer.

(21) Appl. No.: 12/800,008

(22) Filed: May 6, 2010

(65) Prior Publication Data

US 2010/0284530 A1 Nov. 11, 2010

(51) Int. Cl.
*G06F 21/00* (2006.01)

(52) U.S. Cl.
USPC .......................................... 726/32; 713/179

(58) Field of Classification Search
None
See application file for complete search history.

(56) References Cited

U.S. PATENT DOCUMENTS 7,047,413 B2 * 5/2006 Yacobi et al. ................. 713/176
2009/0049558 A1 2/2009 Lotspiech

OTHER PUBLICATIONS

Amiri, E, et al., "High Rate Fingerprinting Codes and the Fingerprinting Capacity," 2009, Symposium on Discrete Algorithms Archive Proceedings of the 20th Annual ACM-SIAM.
Anthapadmanabhan, N., "Randon Codes and Graphs for Secure Communication", 2009, Dissertation Univ of Md, pp. A,B, C, I, -X, 1-170.
Blayer, O. et al., "Improved Versions of Tardosa Fingerprinting Scheme", 2008, Designs, Codes and Cryptography, Kluwer vol. 48, No. 1, pp. 79-103.
Cerou, F. et al., "Experimental Assessment of the Reliability for Watermarking and Fingerprinting Schemes", 2008, EURASIP Journal on Information Security, Hindawi Pub Corp.
Furon, T. et al., "On the Design and Optimization of Tardos Probabilistic Fingerprinting Codes", 2008, Information Hiding; Springer Berlin Heidelberg, pp. 341-356.

(Continued)

*Primary Examiner* — Gilberto Barron, Jr.
*Assistant Examiner* — Jaron K Brunner
(74) *Attorney, Agent, or Firm* — Tutunjian & Bitetto, P.C.

(57) ABSTRACT

The invention relates to a method for decoding a probabilistic anti-collusion code intended to identify at least one sequence of code present in a multimedia content having been used to create an illegal copy of this multimedia content, this method comprising a step of estimating the collusion strategy used to constitute the illegal copy associated with a step of identifying the sequences having been used in creating the illegal copy. The estimation of the collusion strategy used and the identification of sequences having been used to create the illegal copy are carried out sequentially and iteratively in order to refine the precision of each of these according to the following steps: Creating two parameters, a vector of probabilities of the presence of a sequence in the collusion and a vector of probabilities $\theta$ representing the collusion strategy; Initializing the iterative method by initializing one of the two parameters; Estimating the parameter vector of probabilities of the presence of a sequence in the collusion; Estimating the parameter vector of probabilities $\theta$ of the collusion strategy which maximizes the probability of the collusion strategy; Iterating the steps c) and d) until a determined number of iterations or until convergence of the parameter vector of probabilities $\theta$ of the collusion strategy; Identifying at least one sequence of the code present in a multimedia content having been used to create the illegal copy.

13 Claims, 5 Drawing Sheets

(56) References Cited

OTHER PUBLICATIONS

Katzenbeisser, S. et al., "Combining Tardos Fingerprinting Codes and Fingercasting", 2006. Information Hiding; Springer Berlin Heidelbrer, Berlin, pp. 294-310.

Moulin, P., "Universal Fingerprinting: Capacity and Random-Coding Exponents", 2008, Online http://arxiv.org/PS_cache/arxiv/pdf/0801/0801.3837 vs.pdf, pp. 1-57.

Skoric, B. et al., "Tardos Fingerprinting Is Better Than We Thought", 2008. IEEE Transactions on Information Theory, IEEE, US, vol. 54, No. 8, pp. 3663-3676.

Tassa, T., "Low Bandwidth Dynamic Traitor Tracing Schemes", 2005, Journal of Cryptology, Springer-Verlag, NE, vol. 18, No. 2, pp. 167-183.

French Search Report for FR0953071 dated Mar. 16, 2010.

\* cited by examiner

METHOD FOR DECODING A PROBABILISTIC ANTI-COLLUSION CODE

This application claims the benefit, under 35 U.S.C. §119 of French Patent Application 0953071, filed May 7, 2009.

FIELD OF THE INVENTION

The invention relates to the general field of protecting digital content from illegal copying and of identifying the sources at the origin of an illegal copy. More particularly, the invention relates to a method for decoding a probabilistic anti-collusion code intended to identify one or several sources at the origin of an illegal copy of digital content.

The domain of the invention is also known under the name of traitor tracing, active fingerprint, user forensic or transactional watermarking.

BACKGROUND OF THE INVENTION

The protection of digital content, such as for example music, films, photographs, video games, against the creation and distribution of illegal copies is a major stake for the media and entertainment industries, in particular for the suppliers of multimedia content and copyright holders.

For this purpose, various technical solutions are known to fight against the creation and distribution of illegal content. Solutions based on data encryption prevent the creation and distribution of illegal copies properly speaking. Dissuasive solutions based on the traceability of legal copies make it possible to identify the sources of the illegal copy. The field of the invention falls within this latter category of dissuasive solutions.

Identifying sources at the origin of an illegal copy have many applications. For example, an video on-demand server distributes personal copies of the same content to different customers. Certain dishonest customers, called pirates, illegally redistribute a copy of this content for example over a P2P ("Peer-To-Peer") network. The copyright holder wishes to identify the pirates. For this, the video on-demand server inserts a unique identifier into each of the copies via a video watermarking technique which produces many different copies although they appear to be identical. The identifier contained in the illegal copy as such makes it possible to identify the source of this illegal copy and therefore the pirate. However, in order to avoid being recognised, a group of pirates can alter the identifier by forming an illegal copy by mixing their various copies: this is the collusion of copies. Finally, this same group of pirates can, in particular by compressing the illegal copy with a loss, attempt to introduce errors into the identifier of the illegally-redistributed copy and as such have an innocent accused, or conceal the identity of the pirates.

For this purpose, it is known that the identifier inserted into the copy via watermarking is a sequence of symbols of an anti-collusion code. Cryptologists, such as D. Boneh and J. Shaw in "*Collusion-secure fingerprinting for digital data*" (in "IEEE Transactions on Information Theory" volume 44, pages 1897-1905, September 1998) have demonstrated the existence of an optimal code of minimum length making it possible by decoding the mix of a finite number of sequences of the code, to identify the subset of the original sequences used for the collusion regardless of the collusion strategy used to create the copy.

Such a known optimal and widely used code was proposed by Tardos in 2003 in "Optimal probabilistic fingerprint codes" (in "Proc. of the 35th annual ACM symposium on theory of computing", pages 116-125, San Diego, Calif., USA, 2003. ACM). This probabilistic code meets the performance criteria of a decoding that is uniformly effective regardless of the collusion strategy used. It is characterised by its length which depends on the number of users (corresponding to the number of sequences in the code), the maximum number of dishonest users (corresponding to the number of sequences in the code for which identification will be sought), the number of symbols in the alphabet, the probability of a false alert (the fact of accusing a user who is not a part of the collusion), and the probability of miss (the fact of not identifying a user who is a part of the collusion).

Philips has demonstrated (in "Tardos fingerprinting is better than we thought" by B. Skoric, T. Vladimirova, M. Celik, and J. Talstra, "IEEE Transactions on Information Theory" volume 54, pages 3663-3676, August 2008) that if it is sought to retain the probability of a false alert under a certain threshold $\epsilon$, the length of the code must be greater than $2\pi^2 c^2 \log(n\epsilon^{-1})$ for a binary code such as that of Tardos where c represents the number of dishonest customers and n the total number of customers. Philips (in "Symmetric Tardos fingerprinting codes for arbitrary alphabet sizes" by B. Skoric, S. Katzenbeisser and M. Celik, "Designs, Codes and Cryptography", 46(2):137-166, February 2008) also addressed the generalisation of the Tardos code to a code designed on an alphabet of arbitrary size with the idea of minimising the length of the code.

The technical problem with these solutions is the length of the code. On the one hand, as the number of symbols that can be concealed in multimedia content thanks to watermarking techniques is limited, the length of the code must remain compatible with the size of the content to be identified. On the other hand, as the complexity of the decoding is directly linked to the length of the code, it must remain minimal in order to limit the means in terms of calculating power and memory size of the decoding device.

In addition, the anti-collusion codes must also handle the increasing number of users of services in particular video on-demand services and potentially dishonest users. Finally, the codes must also be resistant to errors introduced by noise in the transmission or by transformation of the content.

SUMMARY OF THE INVENTION

The purpose of the invention is to overcome at least one of the disadvantages of prior art by improving the performance of a probabilistic anti-collusion code such as the Tardos code, not when the code is created but when the latter is decoded. In prior art, the performance of the decoding is provided regardless of the collusion strategy of the dishonest users. The idea of the invention is to make hypotheses on the collusion strategy so as to improve the performance of the code.

For this purpose, the invention relates to a method for decoding a probabilistic anti-collusion code intended to identify at least one sequence of code present in a multimedia content having been used to create an illegal copy of this multimedia content, this method comprising a step of estimating the collusion strategy used to constitute the illegal copy associated with a step of identifying the sequences having been used in creating the illegal copy. Indeed, various collusion strategies can be used by the group of pirates to create the illegal copy by mixing their copies block by block, by way of example, uniform drawing, majority voting, minority voting, random voting can be mentioned. The decoding method according to the invention is particularly well adapted when the strategy is random and the strategy does not change for a given collusion of copies. Contrary to what is taught by prior art on the accusation strategy referred to as uniform where no hypothesis is made on the collusion strategy, the decoding method according to the invention determines the strategy used by the group of pirates to create the illegal copy. This knowledge advantageously provides higher performance for the decoding method for a given length of code. It also presents the advantage of either reducing the number of symbols of the code for a given probability of accusing an innocent customer, or handling an increasing number of sequences of the code required for an increasing number of users of the services of content suppliers or an increasing number of pirates.

According to a particularly advantageous aspect of the invention, the step of estimating the collusion strategy used and the step of identifying the sequences having been used to create the illegal copy are carried out sequentially and iteratively in order to refine the precision of each of these. Indeed, the problem with decoding then entails considering that if I know the collusion strategy, then my accusation is correct; if my accusation is correct then the collusion strategy is known. The inventors have judiciously transposed the problem of decoding from the field of cryptology to the field of statistics by representing the collusion strategy and the accusation in the form of probabilities. Such a problem with estimating (or learning) is resolved in the statistics field by learn and matched strategy methods. The method of decoding according to the invention, using these learn and matched strategy methods of which the performance is always higher or equal to the uniform strategy methods, has in addition the advantage of reducing the probability of accusing an innocent customer or of missing a pirate.

According to a particular characteristic of the invention, it comprises steps of:
  a) Creating two parameters namely
     i. a vector of probabilities of the presence of a sequence in the collusion constituted, for each sequence of the code, of the probability of the presence of the sequence in a multimedia content having been used for the collusion, and
     ii. a vector of probabilities θ representing the collusion strategy constitued an estimation of the number of sequences present in the collusion and the conditional probabilities of observing such a symbol in the sequence of the illegal copy knowing the list of symbols of the sequences that are potentially present in the collusion;
  b) Initialising the iterative method by initialising at least one of the two parameters namely
     i. initialising the vector of probabilities of the presence of a sequence in the collusion, initialising the vector of probabilities θ of the collusion strategy and starting of iterations by the step d) or,
     ii. initialising the vector of probabilities θ of the collusion strategy and starting of iterations by the step c);
  c) Estimating the parameter vector of probabilities of the presence of a sequence in the collusion using the sequence observed in the illegal copy, all of the sequences of the code and the parameter vector of probabilities θ of the collusion strategy,
  d) Estimating the parameter vector of probabilities θ of the collusion strategy which maximises the probability of the collusion strategy conditionally to the parameter vector of probabilities θ of the preceding iteration and using the sequence contained in the illegal copy, all of the sequences of said code and the parameter vector of probabilities of the presence of a sequence in the collusion;
  e) Iterating steps c) and d) until a determined number of iterations or until convergence of the parameter vector of probabilities θ of the collusion strategy;
  f) Identifying at least one sequence of the code present in a multimedia content having been used to create the illegal copy.

Indeed, the accusation, i.e. the identification of a user in the collusion process, is modelled by a vector of probabilities: the probability that a user is participating in the collusion. In addition, the collusion strategy is also, in the statistics field, modelled by a vector of probabilities: the conditional probability that a pirate places a given symbol in the illegal copy knowing all of the symbols of the pirates involved in the collusion. The collusion strategy also includes the knowledge of the number of pirates in the collusion. The method of decoding according to the invention, based on this representation, uses advantageously the Expectation-Maximisation algorithm, referred to as the EM algorithm, to find the maximum probability of the collusion strategy depending on the identification of the pirates. The stoppage of the iterative algorithm is determined according to at least two criteria. The first is a determined number of iterations, this criterion offers the advantage of avoiding endless loops and as such limiting the decoding time. The second criterion is the convergence of the parameter of the collusion strategy, i.e. that between two successive iterations, the estimated number of pirates is stable as well as the conditional probabilities that a pirate places a given symbol in the illegal copy knowing all of the symbols of the pirates in the collusion. This criterion offers the advantage of avoiding unnecessary iterations if only the first criterion was applied in the case where the strategy quickly converges and as such improving decoding time.

According to another particular characteristic of the invention, the step of initialising the decoding method checks that the sequence of the anti-collusion code contained in the illegal copy is not equal to one of the sequences of the code. Indeed in this case, the collusion is reduced to a single pirate and the sequence contained in the copy makes it possible to identify the source of the illegal copy, i.e. the pirate. In the case where the sequence of the illegal copy is not a sequence of the code, this check also makes it possible to make the hypothesis for the initialisation of the collusion strategy that the number of pirates at the origin of the collusion is at least two.

According to another particular characteristic of the invention, after the convergence of the iterative algorithm, a sequence is identified as being present in a multimedia content having been used to create the illegal copy when the value of the probability for this sequence is maximal among the values of the vector of probabilities of the presence of a sequence in the collusion. This characteristic makes it possible to accuse the user who has the greatest probability of being guilty.

According to another particular characteristic of the invention, after the convergence of the iterative algorithm, a group of sequences is identified as being present in a multimedia content having been used to create the illegal copy when the value of the probability is greater than a threshold for each of the sequences of this group among the values of the vector of probabilities of the presence of a sequence in the collusion. This characteristic makes it possible for example to accuse the users who have a probability of being guilty greater than that of being innocent if this threshold is set to ½. This threshold can also be advantageously determined in order to satisfy the conditions for false alerts or miss. As such, the copyright holder or the content provider who is seeking to identify a source at the origin of an illegal copy can choose to trace a single user with a greater certitude or to trace a group of users who are presumably at the origin of the collusion. These latter two characteristics advantageously make it possible to respond to the various expectations of customers of such "traitor tracing" solutions, such as content providers or database managers.

According to a particular characteristic of the invention, the step d) takes into account the probability of having errors in the sequence detected in the illegal copy after distribution compared to the sequence contained in the illegal copy after the collusion. Indeed, the sequence of the illegally-distributed copy and for which it is sought to identify the sources can contain errors (i.e. erroneous symbols or which are not part of the alphabet) compared to the sequence of the copy directly obtained after the collusion. These errors can be introduced by decoding the watermarking data distorted by noise in the transmission of the content for example but these errors can also be introduced by the pirates using substantial compression of the content. The method for decoding according to the invention based on the knowledge of the collusion strategy associated with error modelling makes it advantageously more robust to errors caused by noise and the distortion of the content.

According to a particular embodiment, after the identification of at least one sequence present in a multimedia content having been used to create the illegal copy, the steps c) and d) are reiterated in order to identify at least one new sequence in the collusion. As such, when there is a theoretical existence of guilt of a user, resulting for example from a previous iterative decoding method, the parameters of the decoding method can be applied and the same iterative accusation method is used. This embodiment offers the advantage of proposing a decoding in two steps: In a first step, after a reduced number of iterations, a first user is made guilty; in a second step, after a new number of iterations, a group of users is presumed guilty. This embodiment can also propose a solution to converge more quickly towards the identification of the sources at the origin of the illegal copy.

According to a particular characteristic of the invention, the iterative decoding method of a probabilistic anti-collusion code X comprising n sequences $\{x_j\}^{j=1,n}$ intended to identify at least one sequence of the code X present in a multimedia content having been used to create an illegal copy of the multimedia content as well as the collusion strategy used to constitute the illegal copy, comprises the steps of:

a) Creating two parameters
   i. a vector of probabilities $\{Prob[s_j=1]\}^{j=1,n}$ of the presence of a sequence j in the collusion constituted, for each of the n sequences of the code X, of the probability of the variable $s_j$; the variable $s_j$ being equal to 1 if the sequence j is identified as being present in a multimedia content having been used for the collusion, and equal to 0 otherwise and
   ii. a vector of probabilities θ representing the collusion strategy $\theta=\{c', \{Prob[y|t], y\epsilon\chi, t\epsilon T^q_{c'}\}\}$ constituted of an estimation of the number c' of sequences present in the collusion and of the conditional probability Prob[y|t] of observing the symbol y in the sequence of the illegal copy knowing the list of all of the symbols of the c' sequences that are potentially present in the collusion distributed in a type t; the type t being a vector of q values of which the k-th component t(k, i), for an index of symbol i and for the c' sequences j that are potentially present in the collusion, indicates the number of symbols in the list of the c' symbols $\{x(j_1, i), \ldots, x(j_{c'},i)\}$ possible equal to the symbol k; with all of the types t possible created from the c' sequences of symbols of a q-ary alphabet being named $T^q_{c'}$, and the symbols of the code X belonging to a q-ary alphabet $\chi=\{0, 1, \ldots, q-1\}$;

b) Initialising the iterative method by initialising at least one of the two parameters
   i. initialising the vector of probabilities of the presence of a sequence j in the collusion via a non-iterative decoding method, initialising the vector of probabilities θ of the collusion strategy at an arbitrary value and starting of iterations by the step d) or,
   ii. initialising of the parameter vector of probabilities of the collusion strategy for the iteration (0), $\theta^{(0)}$ is initialised at an arbitrary value and starting of the iterations by the step c);

c) Estimating the parameter vector of probabilities of the presence of a sequence j in the collusion for the k-th iteration $Prob[s_j^{(k)}=1|x_j,y,\theta^{(k)}]$ using the sequence y observed in the illegal copy, the sequence $x_j$ of the code X and the parameter vector of probabilities $\theta^{(k)}$ of the collusion strategy at the k-th iteration;

d) Estimating the parameter vector of probabilities of the collusion strategy $\theta^{(K+1)}$ which maximises the probability of the collusion strategy $Q(\theta|\theta^{(k)})$ conditionally to the parameter vector of probabilities of the collusion strategy $\theta^{(k)}$, noted $\theta^{(k+1)}=\text{argmax}_\theta Q(\theta|\theta^{(k)})$, using the sequence y contained in the illegal copy, all of the sequences $\{x_j\}^{j=1,n}$ of the code X and the parameter vector of probabilities of the presence of a sequence in the collusion $\{Prob[s_j=1]\}^{j=1,n}$;

e) Iterating steps c) and d) until a determined number of iterations or until convergence of the parameter vector of probabilities θ of the collusion strategy;

f) Identifying at least one sequence of the code present in a multimedia content having been used to create the illegal copy.

According to another particular characteristic of the invention, the step b) checks that the sequence y of the anti-collusion code X contained in the illegal copy is not equal to one of the sequences noted $x_j$ of the code.

According to another particular characteristic of the invention, in the step f), after a number k of iterations, the sequence j of the code X is identified as being present in a multimedia content having been used to create the illegal copy when the value $Prob[s_j^{(k)}=1|x_j,y,\theta^{(k)}]$ of the probability for this sequence is maximal among the values of the vector of probabilities of the presence of a sequence in the collusion.

According to another particular characteristic of the invention, in the step f), after a number k of iterations, a group of sequences of the code X is identified as being present in a multimedia content having been used to create the illegal copy when the value of the probability $Prob[s_j^{(k)}=1|x_j,y,\theta^{(k)}]$ is greater than a threshold S for each of the sequences j of this group among the values of the vector of probabilities of the presence of a sequence in the collusion.

According to a particular characteristic of the invention, the step d) takes into account the probability Prob[z|y] of having errors in the sequence z detected in the illegal copy after distribution compared to the sequence y contained in the illegal copy after the collusion.

According to a particular embodiment, after the identification of at least one sequence $x_i$ present in a multimedia content having been used to create the illegal copy, the steps c) and d) are reiterated in order to identify at least one new sequence of the collusion by seeking to calculate the vector of conditional probability of the presence of the sequence $x_i$ in the collusion $\{Prob[s_j^{(k)}=1|x_j,x_i,y,\theta^{(k)}]\}^{j=1,n}$.

According to a particular embodiment, the anti-collusion code is a Tardos code.

The method of decoding an anti-collusion code described with the details of the probabilistic parameters offers the same advantages as those mentioned in liaison with the method of decoding an anti-collusion code described hereinabove, i.e. in particular to reduce the number of symbols of the code for a given probability of accusing an innocent user, to handle an increasing number of users of the services of content suppliers or an increasing number of pirates, to be robust to noise and to distortion and to take into account the theoretical knowledge of a pirate.

BRIEF DESCRIPTION OF THE DRAWINGS

The invention will be better understood and illustrated by means of non-restrictive embodiments and advantageous implementations, with reference to the accompanying drawings, wherein.

DETAILED DESCRIPTION OF PREFERRED EMBODIMENTS OF THE INVENTION

Protecting content against collusion comprises two layers: the anti-collusion code and the watermarking of the content. The code provides the identifier or the serial number of the content, the watermarking provides a method for inserting data into a content.

Figure 1:
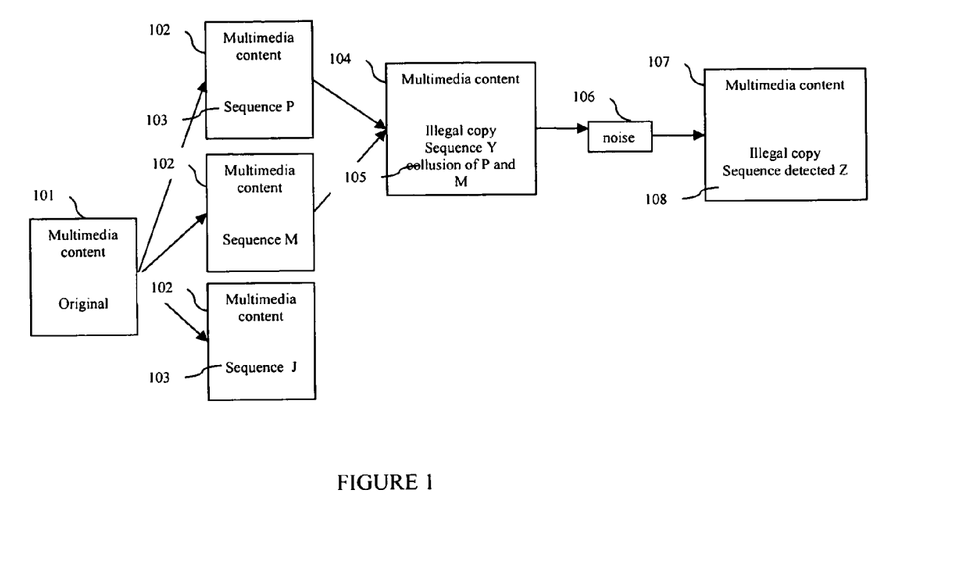
FIG. 1 shows the principle of creating and distributing illegal copies by collusion of content.

FIG. 1 diagrammatically shows the principle of creating and distributing illegal copies by collusion of content. A supplier of content proposes for example on the Internet, a multimedia content 101 which in particular includes a film or a video, music or audio, a video game, an image, a digital book or any other digital document. According to the known principle of active fingerprinting, the supplier of content inserts into each of the legally-distributed copies 102 a unique serial number 103 making it possible to identify the source of the copy and therefore its user. This serial number 103 is a sequence of an anti-collusion code such as the Tardos code. This serial number 103 is inserted into the copy by a watermarking method which makes each copy apparently identical to the user although it is unique. The content is cut into blocks and the symbols of the serial number are concealed block by block in the content. In order to illegally propose a copy of this content while still protecting their identities, a group of pirate users such as P and M can create a copy 104 by mixing their various personal copies block by block, thus producing the serial number Y 105 which does not correspond to a sequence of the code: This is the collusion of copies. In addition this serial number Y 105 can also be altered by a compression with loss of the illegal copy, by a low-pass filtering operation, by adding noise which disturbs the method of decoding the watermarking layer. The collusion of copies can also be carried out by merging blocks. In this case, the users mix their copies pixel by pixel in the case of an image or a video, sample by sample in the case of an audio document. For example, the pixels of the copy are the average, the median (if more than two copies are mixed), the minimum or the maximum of the pixels of each of the copies. In this case, it is the robustness of the method of decoding the watermarking that is called into play so as to detect the correct serial number. These modifications of the serial number i.e. of the sequence of the anti-collusion code are modelled by the noise 106, the serial number detected in the illegal copy 107 for which the sources are sought is then noted as Z 108.

Figure 2:
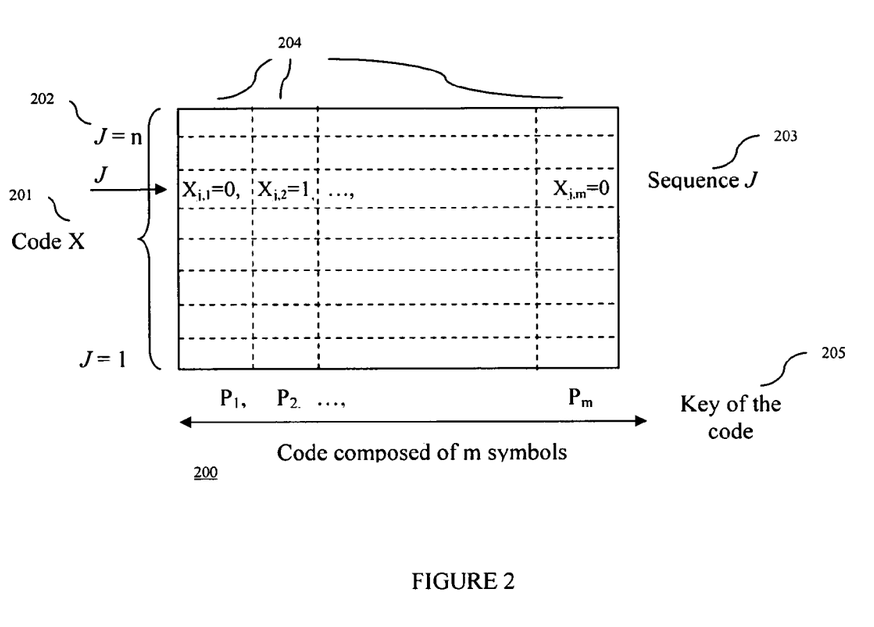
FIG. 2 shows the principle of a Tardos code.

Probabilistic anti-collusion codes such as the Tardos code have been designed in order to make it possible to identify various sources at the origin of a copy obtained via collusion. FIG. 2 shows the principle of constructing such a code X 201. This code comprises n sequences 202 $\{x_j\}^{j=1,n}$ where the sequence index j varies from 1 to n. Each sequence 203 $x_j$ is associated with a user j. A sequence is a list of m symbols 204 $x_j=\{x_{j,1}, x_{j,2}, \ldots x_{j,m}\}$. These symbols 204 belong to a q-ary alphabet $\chi=\{0, 1, \ldots, q\}$. In the case of the Tardos code as shown in FIG. 2, this alphabet is binary $\chi=\{0, 1\}$ et $x_j=\{0, 1, \ldots, 0\}$ for example.

The generation of a probabilistic code is pseudo-random. Using a key 205 $\{P_1, P_2, \ldots P_m\}$, there is a statistical law p such that for any sequence j∈ $\{0, \ldots, n\}$, and for any symbol i∈ $\{0, \ldots, m\}$ in the sequence:

$$\text{Prob}[x_{j,i}=x]=p(x,i).$$

The values p(x,i) are memorised in a matrix P 200, called an auxiliary variable of the code. The line indexes of this matrix are the n sequences of the code and the indexes of the columns are the m symbols of the sequences. This matrix corresponds to a database used as a secret key for listing with all of the sequences 202 of the code X 201.

The anti-collusion codes have the following property: using the mix of the symbols of a finite number of sequences of the code, the decoding of the new sequence obtained as such makes it possible to find the subset of the original sequences used by the mix. A code is designed for a maximum number n of sequences (and as such of users) and a maximum number c of original sequences in the mix (and as such of dishonest users) that can be found. According to prior art, the performance of the decoding is uniform regardless of the collusion strategy. The method of decoding according to the invention includes the estimation of hypotheses on the collusion strategy in such a way as to improve the performance of the decoding. Various collusion strategies shall be more easily explained using FIG. 3. The multimedia content that is sought to be protected is cut into m blocks 301. Each block i conceals, thanks to a watermarking technique, a symbol $x_i$ 302 of the anti-collusion code, thus proposing a version of the block i that is proper to the symbol concealed. As the watermarking principle is not sufficiently secure, users are able to find the blocks of the watermarking layer. However, they are not able to extract the inserted data from it, in other terms pirates are not able to create a block concealing a symbol that they do not have. Dishonest users therefore form a copy 306 by assembling for each of the blocks of the original content P 303 or M 304, a version among all of the versions of the block of which they have knowledge 307. Pirates do not for example have knowledge of the versions of the blocks of the original content J 305. As such, if the collusion groups together c dishonest users 308, their copies are identified by the sequences of which the indexes are C= $\{j_1, \ldots, j_c\}$, and for a given index bloc y(i), they are limited to the choice from among y(i)∈$\{x(j_1,i), \ldots, x(j_c,i)\}$. This therefore imposes a limit to the number of possible sequences that the pirates can form.

Figure 3:
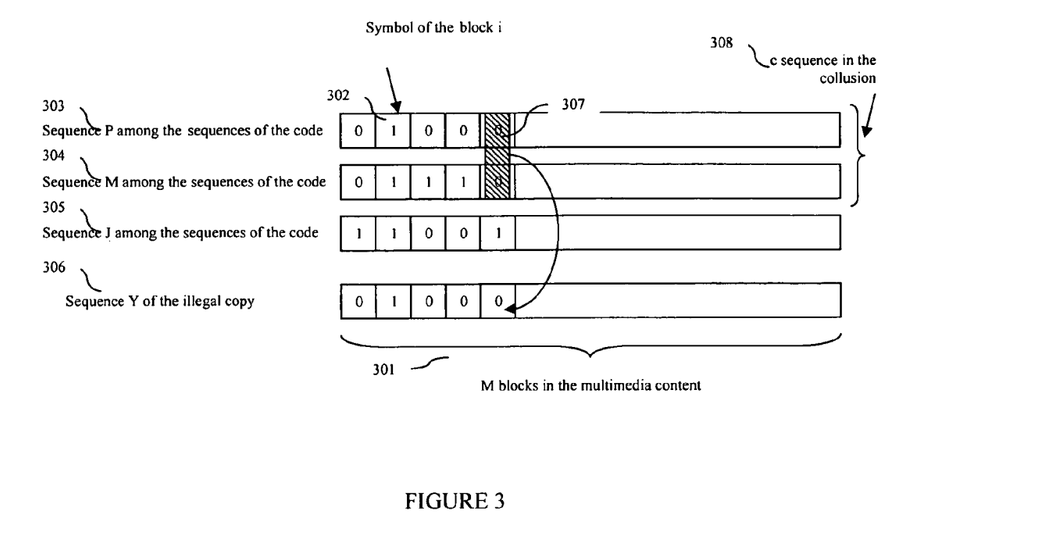
FIG. 3 shows the strategy of the choice of symbols in the collusion of copies.

Various collusion strategies are possible, including:

Uniform drawing, one block is randomly drawn from among the blocks of the users in the collusion with an equal probability for each, for example ½ in the case where there are two.

Majority voting, a block is selected due to its high degree of presence from among the blocks of the users in the collusion.

Minority voting, a block is selected due to its low degree of presence from among the blocks of the users in the collusion.

Random voting, a block is selected randomly from among the blocks of the users in the collusion.

In all cases, the knowledge and the distribution of the symbols that the pirates have available is substantial, this is the notion of type. The symbols of the c sequences present in the collusion are distributed in a type t; the type t is a vector of q values of which the k-th component t(k, i), for a symbol index i and for the c sequences j that are potentially present in the collusion, indicates the number of symbols in the list of the symbols $\{x(j_1,i), \ldots, x(j_c,i)\}$ possible equal to the symbol k; all of the types t possible created using c sequences of symbols of a q-ary alphabet are named $T^q_c$.

According to a particular characteristic of the invention, the collusion strategy is defined as the conditional probability that the pirates place a symbol y in the illegal copy knowing the type of all of the symbols that they have. This modelling that is noted Prob[y|t] with y∈χ is a possible representation in the probabilistic domain of the various strategies in particular those mentioned hereinabove whether they are deterministic or random. For example in the case of majority voting (where one block is selected if it is the most represented among the block of the users in the collusion), the Prob[y|t] will be maximal for the type including the maximum number of identical symbols among the sequences in the collusion. The decoding method according to the invention is particularly well adapted when the strategy is random and when it does not change for a given collusion of copies.

According to another particular characteristic of the invention, the presence of a user in the collusion is also modelled in the probabilistic domain. A variable $s_j$ is defined which takes the value 1 if the sequence j is identified as being present in a multimedia content having been used for the collusion, and the value 0 otherwise. The presence of a user in the collusion is then modelled by the probability Prob[$s_j$=1].

Figure 5:
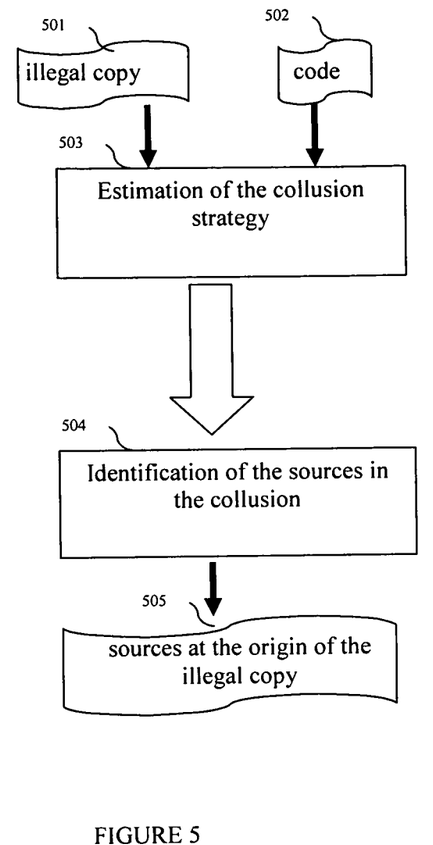
FIG. 5 shows the method of decoding of an anti-collusion code according to the invention.

The method of decoding according to the invention is based on this double modelling of the problem in the fight against collusion. Indeed, contrary to what is taught by prior art on the accusation strategy referred to as uniform where no hypothesis is made on the collusion strategy, the decoding method according to the invention determines the strategy used by the group of pirates to create the illegal copy. FIG. 5 shows the method of decoding of an anti-collusion code according to the invention. The method intends to identify at least one sequence of code present in a multimedia content having been used to create an illegal copy of this multimedia content. Using the sequence contained in the illegal copy (501) and the sequences of the code (502), the method of decoding an anti-collusion code includes a step of identifying the sources at the origin of the illegal copy (505). The method further comprises a step of identifying the sources (504) such as taught by the so-called uniform methods of accusation, a step of estimating the collusion strategy (503). This collusion strategy represents the choice made by the pirates to create the illegal copy for example uniform drawing, majority voting or minority voting. According to a variant embodiment, the step (503) of estimating the collusion strategy used and the step (504) of identifying the sequences having been used to create the illegal copy are carried out sequentially and iteratively in order to refine the precision of each of these.

Figure 4:
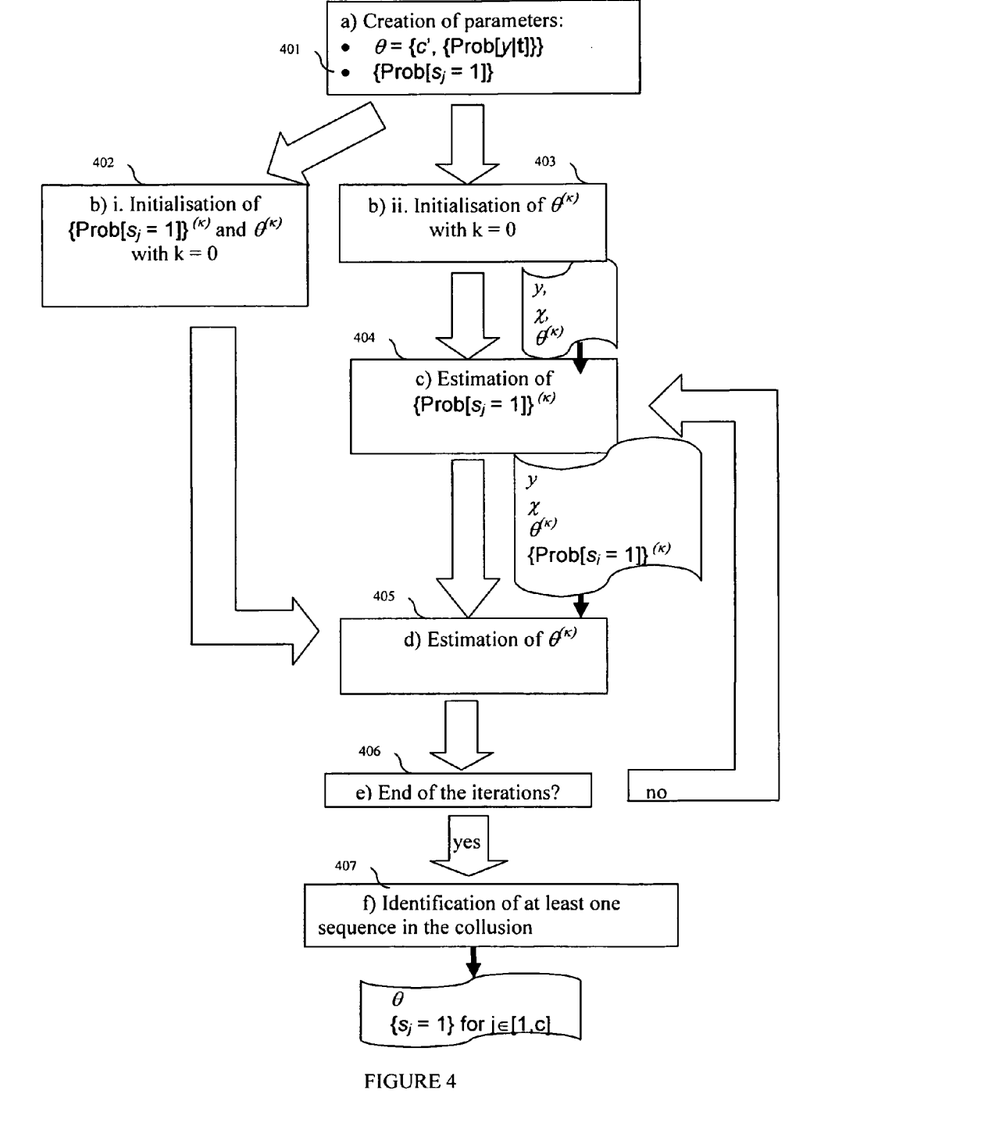
FIG. 4 shows the method of iterative decoding of an anti-collusion code according to a particular embodiment.

FIG. 4 shows one of the embodiments of the iterative decoding method of a probabilistic anti-collusion code X comprising n sequences $\{x_j\}^{j=1,n}$ intended to identify at least one sequence of the code X present in a multimedia content having been used to create an illegal copy of the multimedia content as well as the collusion strategy used to constitute the illegal copy. During a first step 401, two parameters including the modelling of the problem of decoding in accordance with the invention are created, a vector of probabilities $\{\text{Prob}[s_j=1]\}^{j=1,n}$ of the presence of a sequence j in the collusion constituted, for each of the n sequences of the code X, of the probability of the variable $s_j$; the variable $s_j$ being equal to 1 if the sequence j is identified as being present in a multimedia content having been used for the collusion, and equal to 0 otherwise, and a vector of probabilities θ representing the collusion strategy $\theta=\{c',\{\text{Prob}[y|t],y\in\chi,t\in T^q_{c'}\}\}$ constituted of an estimation of the number c' of sequences present in the collusion and of the conditional probability Prob[y|t] of observing the symbol y in the sequence of the illegal copy knowing the list of all of the symbols of the c' sequences that are potentially present in the collusion distributed in a type t; the type t being a vector of q values of which the k-th component t(k, i), for an index of symbol i and for the c' sequences j that are potentially present in the collusion, indicates the number of symbols in the list of the c' symbols $\{x(j_1,i), \ldots, x(j_{c'},i)\}$ possible equal to the symbol k; with all of the types t possible created from the c' sequences of symbols of a q-ary alphabet being named $T^q_{c'}$; and the symbols of the code X belonging to a q-ary alphabet=$\{0, 1, \ldots, q-1\}$.

The step of initialising the iterative method includes the initialising of one of the two parameters. As such the initialising step 402 includes the initialising of a vector of probabilities of the presence of a sequence j in the collusion by a non-iterative method for decoding using a conventional decoding of an anti-collusion code such as the uniform decoding method proposed by Tardos. During the step 402, the vector of probabilities θ of the collusion strategy is also initialised at an arbitrary value used during the first iteration. This step 402 is then followed by the step 405 of estimating the vector of probabilities θ. In the method of decoding in accordance with the invention, the parameter vector of probabilities of the collusion strategy is advantageously initialised. As such, the initialising step 403 includes the initialising of the parameter vector of probabilities of the collusion strategy for the first iteration. The step 403 is then followed by the step 404 of estimating the vector of probabilities of the presence of the sequence in the collusion. According to another particularly advantageous embodiment, the initialising step 402 or 403 checks that the sequence y of the anti-collusion code X contained in the illegal copy is equal to one of the sequences noted as $x_j$ of the code, i.e. y=$x_j$. In this case (y=$x_j$), the collusion is reduced to one user who is identified by his sequence $x_j$. In the opposite case (y≠$x_j$), the collusion contains at least two users and $\theta^{(0)}$ is initialised in the case of a binary code in the steps 402 or 403 for example at:

$c'^{(0)}=2$,

Prob[y|t]$^{(0)}$=0 if t(y)=0,

Prob[y|t]$^{(0)}$=1 if t(y)=2,

Prob[y|t]$^{(0)}$=½ if t(y)=1.

The step 404 of estimating the parameter vector of probabilities of the presence of a sequence j in the collusion, includes for the k-th iteration, a calculation of $\text{Prob}[s_j^{(k)}=1|x_j, y, \theta^{(k)}]$ using the sequence y observed in the illegal copy, of the sequence $x_j$ of the code X and of the parameter vector of probabilities $\theta^{(k)}$ of the collusion strategy. The step 404 is followed by the step 405 of estimating the parameter vector of probabilities of the collusion strategy $\theta^{(k+1)}$. In the step 405, the parameter $\theta^{(k+1)}$ is sought which maximises the probability of the collusion strategy $Q(\theta|\theta^{(k)})$ conditionally to the parameter vector of probabilities of the collusion strategy $\theta^{(k)}$ noted $\theta^{(k+1)} = \text{argmax}_\theta Q(\theta|\theta^{(k)})$ using the sequence y contained in the illegal copy, all of the sequences $\{x_j\}^{j=1,n}$ of the code X and the parameter vector of probabilities of the presence of a sequence in the collusion $\{\text{Prob}[s_j=1]\}^{j=1,n}$.

At the end of the step 405, a step 406 tests the end of the iterations of steps 404 and 405 according to the method of decoding in accordance with the invention. According to the embodiments of the invention, at least two criteria can determine a test for stopping iterations. The first criterion is a determined number iterations which can be fixed (for example predetermined or obtained through configuration) or variable (according to any criterion, for example, taking into account the quality of the preceding decoding: the number of iterations is incremented if the quality is not sufficient or, on the contrary is decreased if an inferior quality is satisfactory), the iterations are stopped if the number of iterations k is equal to the determined number of iterations. This first criterion offers the advantage of avoiding endless loops and as such limiting the decoding time and resources. The second criterion is the convergence of the parameter of the collusion strategy i.e. between two successive iterations, the estimated number of pirates is stable $c'^{(k)}=c'^{(k+1)}$ and the conditional probabilities that a pirate places a given symbol in the illegal copy knowing all of the symbols of the pirates in the collusion are less than a determined threshold T i.e. $\theta^{(k+1)} - \theta^{(k)} \leq T$. If the test 406 is negative (if the determined number of iterations is not reached and if the parameter of the collusion strategy has not converged), the algorithm for decoding is reiterated by the step 404 with the updated parameters.

If the test 406 is positive (if the determined number of iterations is reached or if the parameter of the collusion strategy has converged), a step 407 of identifying the pirates makes it possible to determine at least one sequence of the code present in a multimedia content having been used to create the illegal copy. According to the embodiments of the invention at least two criteria can determine a sequence present in the collusion. The first criterion is the maximum value $\text{Prob}[s_j^{(k)}=1|x_j,y,\theta^{(k)}]$ of the probability for a given sequence among the values of the vector of probabilities of the presence of a sequence in the collusion. This first criterion makes it possible advantageously to identify a pirate with a relatively low probability of error of a false alert. The second criterion is the value of the probability $\text{Prob}[s_j^{(k)}=1|x_j,y,\theta^{(k)}]$ greater than a threshold S for each of the sequences j of a group among the values of the vector of probabilities of the presence of a sequence in the collusion. For example, this criterion makes it possible advantageously to accuse the users who have a probability of being guilty greater than that of being innocent if this threshold is set to ½. In an alternative embodiment, this threshold is advantageously determined in order to satisfy the conditions for false alerts or miss. According to various alternatives, the threshold S is fixed (for example predetermined or obtained through configuration) or variable (according to any criterion, for example, taking into account the quality of the preceding decoding: the threshold S is increased if the quality is not sufficient or, on the contrary is decreased if an inferior quality is satisfactory).

The method of decoding in accordance with the invention has the advantage of being particularly robust to errors caused by noise and the distortion of the content. In a new manner compared to what prior art teaches, these errors can also be taken into account in the method of decoding. The parameters of the method of decoding are adapted and the same iterative method of decoding is used. If z is noted as the sequence detected by the layer of watermarking in the illegal copy after distortion. The sequence z is a version with errors of the sequence y contained in the illegal copy created by mixing blocks. The hypothesis is made that z is a version of y after transmission in a memory less discrete channel, there is therefore a statistical model linking the symbols y(i) and z(i) represented by the conditional probability $\text{Prob}[z(i)|y(i)]$. The vector of probabilities $\theta$ taking into account such errors is thus noted as $\text{Prob}[z|t]=\Sigma_{y\in\chi}\text{Prob}[z|y].\text{Prob}[y|t]$. For example in the case where the memory less discrete channel is a symmetric q-ary channel with a probability of error of $\eta$, then the vector of probabilities $\theta$ is written $\text{Prob}[z|t,\eta]=(1-\eta q/(q-1))\text{Prob}[z|t]+\eta/(q-1)$.

The method of decoding according to the invention also has the advantage of being able to take into account the knowledge of a theoretical guilt of a user, resulting for example from a previous iterative decoding method. The parameters of the method of decoding are adapted and the same iterative method of accusation is used. If $x_l$ is noted as a sequence present in a multimedia content having been used to create the illegal copy, the vector of probabilities if the presence of a sequence conditional to the sequence $x_l$ is written:

$$\{\text{Prob}[s_j^{(k)}=1|x_j,x_l,y,\theta^{(k)}]\}^{j=1,n}.$$

According to an advantageous embodiment, the anti-collusion code is a binary Tardos code. The maximum number of sequences that the code makes possible through construction to find is noted as c. As such q=2 and there is c+1 types possible. The types can be noted as pairs ($\sigma$, c-$\sigma$) where $\sigma$ is the number of symbols at '1' that the pirates possess. The number of symbols at '1' that the pirates possess, noted as $\sigma$, varies between 0 and c. The vector of probabilities $\theta$ is thus written for c' estimated pirates $\{\{\text{Prob}[y=1|\sigma=0],\text{Prob}[y=1|\sigma=1],\ldots,\text{Prob}[y=1|\sigma=c']\}\in[0,1]^{c'+1}$. This vector comprises the probability of observing a '1' in the sequence of the illegal copy knowing that respectively no symbol of sequences of the collusion is at '1', a symbol of the sequences of the collusion is at '1' and up to all of the c' symbols of the sequences of the collusion are at '1'. It should also be taken into account that without error in detecting the layer of watermarking and as the pirates cannot create new symbols, the symbol in the illegal copy comes from either the pirates symbols at a '1' or from pirates symbols at a '0' therefore $\text{Prob}[y=1|\sigma]+\text{Prob}[y=1|c'-\sigma]=1$. It should also be taken into account that without error in detecting the layer of watermarking and as the pirates cannot create new symbols, the sequence of the illegal copy cannot contain a symbol at '1' if none of the symbols of the pirates is at '1' ($\text{Prob}[y=1|0]=0$) and inversely the sequence of the illegal copy contains a symbol at '1' if all of the symbols of the pirates are at '1' ($\text{Prob}[y=1|c']=1$).

Naturally, the invention is not limited to the embodiments previously described.

In particular, the invention is compatible with the anti-collusion codes that are separate from the Tardos codes such as the Boneh-Shaw codes. Moreover, according to a particular characteristic, the parameters of the method of decoding have been detailed for the codes designed on an alphabet of a size that is greater than or equal to two such as those taught in "Symmetric Tardos fingerprinting codes for arbitrary alphabet sizes" by B. Skoric, S. Katzenbeisser et M. Celik.

Moreover, the invention is compatible with an estimation of the collusion strategy which is not carried out sequentially and iteratively with the identification of the sequences in the collusion. Indeed, according to another embodiment, the number of iterations can be reduced to a single occurrence: estimation of the collusion strategy then identification of the sequences in the collusion. An alternative corresponding to this other embodiment is taught in a patent application filed this day by the applicant and proposing a method of rapid decoding comprising a step of selecting the collusion strategy from among a set of models of the collusion strategy.

What is claimed is:

1. A method for decoding a probabilistic anti-collusion code intended to identify at least one sequence of said code present in a multimedia content having been used to create an illegal copy of said multimedia content, comprising:
   a) Creating two parameters namely:
      i. a vector of probabilities of the presence of a sequence in the collusion constituted, for each sequence of said code, of the probability of the presence of the sequence in a multimedia content having been used for the collusion, and
      ii. a vector of probabilities $\theta$ representing the collusion strategy constituted of an estimation of the number of sequences present in the collusion and of the conditional probabilities of observing such a symbol in the sequence of said illegal copy knowing the list of symbols of the sequences that are potentially present in the collusion;
   b) Initialising an iterative method by initialising at least one of the two parameters namely:
      i. initialising said vector of probabilities of the presence of a sequence in the collusion, initialising said vector of probabilities $\theta$ of the collusion strategy and starting of iterations by the step d) or,
      ii. initialising said vector of probabilities $\theta$ of the collusion strategy and starting of iterations by the step c);
   c) Estimating said parameter vector of probabilities of the presence of a sequence in the collusion using the sequence observed in the illegal copy, all of the sequences of said code and said parameter vector of probabilities $\theta$ of the collusion strategy, using a decoding device;
   d) Estimating said parameter vector of probabilities $\theta$ of the collusion strategy which maximizes the probability of the collusion strategy conditionally to said parameter vector of probabilities $\theta$ of the preceding iteration using the sequence contained in the illegal copy, all of the sequences of said code and said parameter vector of probabilities of the presence of a sequence in the collusion, using a decoding device;
   e) Iterating the steps c) and d) until a determined number of iterations or until convergence of the parameter vector of probabilities $\theta$ of the collusion strategy; and
   f) Identifying at least one sequence of said code present in a multimedia content having been used to create said illegal copy.

2. The method according to claim 1, wherein the step b) checks that the sequence of said anti-collusion code contained in the illegal copy is not equal to one of the sequences of said code.

3. The method according to claim 1, wherein in step f), a sequence is identified as being present in a multimedia content having been used to create said illegal copy when the value of the probability for this sequence is maximal among the values of said vector of probabilities of the presence of a sequence in the collusion.

4. The method according to claim 1, wherein in step f), a group of sequences of said code is identified as being present in a multimedia content having been used to create said illegal copy when the value of the probability is greater than a threshold for each of the sequences of this group among the values of said vector of probabilities of the presence of a sequence in the collusion.

5. The method according to claim 1, wherein the step d) takes into account the probability of having errors in the sequence detected in said illegal copy after distribution compared to the sequence contained in said illegal copy after the collusion.

6. The method according to claim 3, wherein after the identification of at least one sequence present in a multimedia content having been used to create said illegal copy, the steps c) and d) are reiterated in order to identify at least one new sequence in the collusion.

7. A method for decoding of a probabilistic anti-collusion code X intended to identify at least one sequence of said code present in a multimedia content having been used to create an illegal copy of said multimedia content, said code comprising n sequences $\{x_j\}^{j=1,n}$ intended to identify at least one sequence of said code X present in a multimedia content having been used to create an illegal copy of said multimedia content as well as the collusion strategy used to constitute said illegal copy, comprising:
   a) Creating two parameters namely:
      i. a vector of probabilities $\{\text{Prob}[s_j=1]\}^{j=1,n}$ of the presence of a sequence j in the collusion constituted, for each of the n sequences of said code X, of the probability of the variable $s_j$; the variable $s_j$ being equal to 1 if the sequence j is identified as being present in a multimedia content having been used for the collusion, and equal to 0 otherwise and
      ii. a vector of probabilities $\theta$ representing the collusion strategy $\theta=\{c', \{\text{Prob}[y|t], y\in\chi, t\in T^q_{c'}\}\}$ of an estimation of the number c' of sequences present in the collusion and the conditional probability $\text{Prob}[y|t]$ of observing the symbol y in the sequence of the illegal copy knowing the list of all of the symbols of the c' sequences that are potentially present in the collusion distributed in a type t; the type t being a vector of q values of which the k-th component t(k, i), for an index of symbol i and for the c' sequences j that are potentially present in the collusion, indicates the number of symbols in the list of symbols $\{x(j_1,i), \ldots, x(j_{c'},i)\}$ possible equal to the symbol k; with all of the types t possible created from the c' sequences of symbols of a q-ary alphabet being named $T^q_{c'}$; and the symbols of the code X belonging to a q-ary alphabet $\chi=\{0, 1, \ldots, q-1\}$;
   b) Initialising the iterative method by initialising one of the two parameters namely:
      i. initialising the vector of probabilities of the presence of a sequence j in the collusion via a non-iterative decoding method, initialising said vector of probabilities $\theta$ of the collusion strategy at an arbitrary value and starting of iterations by the step d) or,
      ii. initialising the parameter vector of probabilities of the collusion strategy for the iteration (0), $\theta^0$ is initialised at an arbitrary value, and starting of the iterations by the step c);
   c) Estimating said parameter vector of probabilities of the presence of a sequence j in the collusion for the k-th iteration $\text{Prob}[s_j^{(k)}=1|x_j,y,\theta^{(k)}]$ using the sequence y observed in the illegal copy, the sequence $x_j$ of said code X and said parameter vector of probabilities $\theta^{(k)}$ of the collusion strategy, using a decoding device;

d) Estimating said parameter vector of probabilities of the collusion strategy $\theta^{(k+1)}$ which maximises the probability of the collusion strategy $Q(\theta|\theta^{(k)})$ conditionally to the parameter vector of probabilities of the collusion strategy $\theta^{(k)}$ noted $\theta^{(k+1)}=\text{argmax}_\theta Q(\theta|\theta^{(k)})$ using the sequence y contained in the illegal copy, all of the sequences $\{x_j\}_{j=1}^n$ of the code X and the parameter vector of probabilities of the presence of a sequence in the collusion $\{\text{Prob}[s_j=1]\}^{j=1,n}$, using a decoding device;

e) Iterating the steps c) and d) until a determined number of iterations or until convergence of the parameter vector of probabilities θ of the collusion strategy;

f) Identifying at least one sequence of said code present in a multimedia content having been used to create said illegal copy.

8. The method according to claim 7, wherein the step b) checks that the sequence y of said anti-collusion code X contained in the illegal copy is not equal to one of the sequences noted $x_j$ of said code.

9. The method according to claim 7, wherein in the step f), after a number of k iterations, a sequence j of said code X is identified as being present in a multimedia content having been used to create said illegal copy when the value $\text{Prob}[s_j^{(k)}=1|x_j,y,\theta^{(k)}]$ of the probability for this sequence is maximal among the values of said vector of probabilities of the presence of a sequence in the collusion.

10. The method according to claim 7, wherein in the step f), after a number k of iterations, a group of sequences of said code X is identified as being present in a multimedia content having been used to create said illegal copy when the value of the probability $\text{Prob}[s_j^{(k)}=1|x_j,y,\theta^{(k)}]$ is greater than a threshold S for each of the sequences j of this group among the values of said vector of probabilities of the presence of a sequence in the collusion.

11. The method according to claim 7, wherein step d) takes into account the probability $\text{Prob}[z|y]$ of having errors in the sequence z detected in said illegal copy after distribution compared to the sequence y contained in said illegal copy after the collusion.

12. The method according to claim 9, wherein after the identification of at least one sequence $x_i$ present in a multimedia content having been used to create said illegal copy, the steps c) and d) are reiterated in order to identify at least one new sequence of the collusion by seeking to calculate the vector of conditional probability of the presence of the sequence $x_i\{\text{Prob}[s_j^{(k)}=1|x_j, x_i,y,\theta^{(k)}]\}^{j=1,n}$.

13. The method according to one of the claim 1 wherein the anti-collusion code is a Tardos code.

* * * * *

UNITED STATES PATENT AND TRADEMARK OFFICE
CERTIFICATE OF CORRECTION

PATENT NO.        : 8,516,608 B2                                Page 1 of 1
APPLICATION NO.   : 12/800008
DATED             : August 20, 2013
INVENTOR(S)       : Luis Perez-Freire et al.

It is certified that error appears in the above-identified patent and that said Letters Patent is hereby corrected as shown below:

In the Claims

Column 14 - Claim 7:

Line 21 should read: --A method for decoding a probabilistic anti-collusion--.

Column 14 - Claim 7:

Line 50 symbol should read: -- $\{x(j_1,i), \ldots, x(j_{c'},i)\}$ --.

Signed and Sealed this
Twenty-ninth Day of October, 2013

Teresa Stanek Rea
*Deputy Director of the United States Patent and Trademark Office*